United States Patent
Nan et al.

(10) Patent No.: US 8,587,963 B2
(45) Date of Patent: Nov. 19, 2013

(54) RESONANT CONVERTER EQUIPPED WITH MULTIPLE OUTPUT CIRCUITS TO PROVIDE MULTIPLE POWER OUTLETS

(75) Inventors: Zhanghe Nan, Xi'an (CN); Ming Xu, Blacksburg, VA (US); Qiao Liang Chen, Xi'an (CN)

(73) Assignee: FSP Technology Inc., Taoyuan, Taoyuan County (TW)

( * ) Notice: Subject to any disclaimer, the term of this patent is extended or adjusted under 35 U.S.C. 154(b) by 557 days.

(21) Appl. No.: 12/356,838

(22) Filed: Jan. 21, 2009

(65) Prior Publication Data

US 2010/0182803 A1   Jul. 22, 2010

(51) Int. Cl.
  *H02M 3/335*    (2006.01)
(52) U.S. Cl.
  USPC ............... 363/21.02; 363/21.06; 323/237
(58) Field of Classification Search
  USPC ........... 323/217, 237; 363/21.02, 21.03, 363/21.06–21.11, 76, 78, 79, 125, 140; 307/24, 33, 34, 37, 98, 125, 141
  See application file for complete search history.

(56) References Cited

U.S. PATENT DOCUMENTS

| | | | |
|---|---|---|---|
| 5,481,449 A * | 1/1996 | Kheraluwala et al. | 363/17 |
| 5,576,941 A * | 11/1996 | Nguyen et al. | 363/21.07 |
| 6,845,018 B2 * | 1/2005 | Ohishi | 363/21.06 |
| 6,992,902 B2 | 1/2006 | Jang et al. | |
| 7,209,369 B1 | 4/2007 | Yasumura | |
| 7,447,048 B2 | 11/2008 | Yasumura | |
| 7,606,051 B1 * | 10/2009 | Wittenbreder, Jr. | 363/39 |
| 2006/0119185 A1 * | 6/2006 | Steigerwald et al. | 307/75 |
| 2008/0247194 A1 * | 10/2008 | Ying et al. | 363/17 |
| 2009/0213623 A1 * | 8/2009 | Yang | 363/49 |
| 2009/0251925 A1 * | 10/2009 | Usui et al. | 363/16 |

FOREIGN PATENT DOCUMENTS

| | | |
|---|---|---|
| TW | M306519 | 2/2007 |
| TW | 200742237 | 11/2007 |
| TW | 200826457 | 6/2008 |
| TW | M340660 | 9/2008 |

\* cited by examiner

*Primary Examiner* — Adolf Berhane
*Assistant Examiner* — Gustavo Rosario Benitez
(74) *Attorney, Agent, or Firm* — Winston Hsu; Scott Margo

(57) ABSTRACT

A resonant converter equipped with a phase shifting output circuit includes a resonant circuit to receive input power and regulate to become at least one resonant power, a switch unit to switch an ON period for the input power to pass through the resonant circuit and a power transformation circuit to regulate the resonant power and output a transformed power. The resonant converter further has a primary output circuit and at least one secondary output circuit. The primary output circuit regulates the transformed power to become a primary output power. A resonant control unit captures a feedback signal from the primary output circuit and generates a resonant control signal. A phase shifting control unit receives the resonant control signal and regulate to become a phase shifting driving signal. The secondary output circuit is controlled by the phase shifting driving signal and provides a secondary output power.

20 Claims, 16 Drawing Sheets

RESONANT CONVERTER EQUIPPED WITH MULTIPLE OUTPUT CIRCUITS TO PROVIDE MULTIPLE POWER OUTLETS

FIELD OF THE INVENTION

The present invention relates to a resonant converter equipped with a phase shifting output circuit and particularly to a power transformation circuit adopted resonant and phase shifting control techniques.

BACKGROUND OF THE INVENTION

At present regulations on power supply efficiency in various countries are increasingly upgraded to a higher level. For instance, Energy star publishes 80 PLUS standard for multi-output power efficiency of computers and servers. The 80 plus standard has four categories: 80 plus E-star 4.0, 80 plus bronze, 80 plus silver and 80 plus gold. 80 plus gold demands power supply to have efficiency of 87%, 90% and 87% when loading is respectively at 20%, 50% and 100%. As the present power supply of computers and servers generally adopts the structure of PFC+multi-output DC/DC, when the PFC (Power Factor Correction) is at low line, the efficiency usually can reach 94%. To meet the requirement of 80 plus gold, the efficiency of the DC/DC converter at the rear stage has to be greater than 96%. As miniaturization is the prevailing trend for design of electronic devices, a higher power density is required on computer power supply. Hence it is a greater challenge for power supply producers to develop multi-output DC/DC converters with a higher efficiency and greater power density.

A high power density multi-output DC/DC converter has to meet three basic requirements: high efficiency, high voltage stability and small size. The present ATX (Advanced Technology Extended) does not have a special requirement on the issue of size shrinking, hence high efficiency and high voltage stability become the main goals of power supply design. On the design of power supply, hold up time of computer supply is another important design factor. When input power exists, PFC transforms the input power to an adjustable DC voltage (such as 400V). When the input power is absent, the power supply has to maintain output voltage at 20 mS. The 20 mS is the hold up time. During the hold up time, the voltage of 400V output from the PFC continuously drops until reaching a minimum voltage, then DC/DC turns off, and the output voltage vanishes. During the hold up time, output has to be maintained stable. Hence DC/DC must be operable at a selected input voltage range. The selected input voltage range relates to capacitor capacitance and power, and can be indicated by an equation as follow:

$$E = \frac{1}{2}C(V_{bus}^2 - V_{min}^2)^{20}$$

Based on the equation above, the capacitor capacitance is in inverse proportion with the voltage range. Hence by enlarging the input voltage range, the size of the capacitor can be reduced to increase the power density. But increasing the input voltage range makes topology selection and circuit design more difficult. This is an issue yet to be fully resolved.

The key factor of increasing efficiency is to restrain switching loss of the converter. The conventional converter performs switching at a high current or voltage (hard switching) and generates a great switching loss. An improved approach has been developed to perform switching at a lower current or voltage (soft switching), or even at zero current or zero voltage. At present, there is a number of circuit topology to provide a higher efficiency such as active clamp forward (ACF) circuit, LLC circuit and dual active bridge (DAB) circuit. FIG. 1 illustrates a typical ACF circuit. Its structure and operational principle are known in the art, thus details are omitted. The ACF circuit can partially or fully realize ZVS (zero voltage switching) of a primary switch, hence has a higher efficiency. Meanwhile, the magnetic core of the transformer operates in the first and third quadrants, hence its utilization is higher. However, ACF circuit has a number of inherent drawbacks, such as hard switching off causes a greater switching loss, an extra inductor has to be added and a smaller magnetizing inductance is needed to fully realize the ZVS. Increasing the inductance reduces the equivalent duty cycle, lowering the magnetizing inductance increases the magnetizing current and results in a greater copper loss and conduction loss. It also has cross regulation problem. Hence the conventional PWM (pulse-width modulation) controlled ACF is difficult to meet the duty requirement of a higher efficiency and a greater voltage range at the same time. As a result, the ACF structure generally does not provide a high efficiency as desired. But due to it can realize ZVS during turn-on, its efficiency is higher than the general PWM structures such as double-transistor forward, half-bridge circuit and the like. On-semi Co. provides an ACF design with 250W ATX power to meet 80 plus E-star 4.0. The power can achieve an efficiency greater than 80% at the loading conditions of 20%, 50% and 100%.

At present, the rear stage DC/DC with most promising application prospect is LLC circuit (referring to FIG. 2). The LLC circuit is a resonant circuit consisting of two L (inductors) and one C (capacitor). Through a switch 301, the period of an input power flowing to a LLC circuit 302 can be controlled. The input power has gain through the LLC circuit 302, then is sent through a transformer 303 to the secondary side thereof to be output. The primary side of the transformer has a control chip 304 to generate a control pulse to regulate the switching period of the switch 301 through a driver 305. FIG. 3 shows the waveforms at various nodes of the circuit depicted in FIG. 2, and FIG. 4 shows the resonant characteristics curves of the circuit. The LLC circuit provides many advantages, such as switching at zero voltage, lower turn-off loss, wide operation voltage range without sacrificing efficiency at normal condition, lower PFC capacitor capacitance, smaller size and higher power density.

The DAB circuit for a greater power DC/DC can achieve a higher power density. FIG. 5 illustrates a DAB circuit which includes two sets of full bridge switches 301, an inductor and a transformer 303 to isolate power. It also controls operation of the switch 301 through a control chip 304 and a driver 305. FIG. 6 shows the power waveforms at various nodes of the circuit depicted in FIG. 5. The drawing shows that the phase of the bridge of the primary side and that of the secondary side in FIG. 5 has a phase shifting angle Φ. By changing the phase shifting angle and the switching frequency, output gain of the circuit can be regulated. Moreover, by controlling the phase of the primary side and the secondary side, ZVS of all switches can be accomplished and output power also can be regulated. It has the characteristics of performing ZVS at the primary side and the secondary side, and operating with a wide voltage range without sacrificing the efficiency at normal conditions. Due to the DAB circuit can realize ZVS for the switch at the secondary side, it can be used in higher voltage output environments that require a higher efficiency. The DAB circuit has a small inductance for energy transmission, thus can be implemented through leakage inductance of a transformer. Hence the DAB circuit has a higher power density. On the computer power supply for a lower voltage output application, the DAB circuit has a greater turn-off loss than the LLC circuit. But the DAB circuit is easier to accomplish synchronous rectification than the LLC circuit.

As the LLC circuit has higher efficiency, the multi-output DC/DC converter adopted the LLC structure is a hot research topic. There are some typical structures, such as LLC+MagAmp (magnetic amplifier) (referring to FIG. 7), LLC coupling with a transformer to accomplish multiple outputs (referring to FIG. 8), LLC collocates buck and multiple independent LLCs to accomplish multiple outputs, and the like. All the circuits mentioned above have their share of advantages and drawbacks, and also have their desirable applications. The circuit of LLC+MagAmp shown in FIG. 7 has a switch 301, an LLC circuit 302, a transformer 303, a control chip 304 and a driver 305. The LLC circuit 302 provides primary output. The transformer 303 has a secondary side connecting to two magnetic amplifiers (MagAmp) 307 and an ancillary circuit such as control circuit 306 to aid output. The magnetic amplifier (MagAmp) 307 is controlled to function as a switch. The magnetic amplifier (MagAmp) 307 and the connecting ancillary circuit function as a buck circuit. Such a structure has benefits lower cost, more accurate adjustment for the output of each circuit, simpler control and the like. But it also has its share of drawbacks, such as: 1. MagAmp choke incur magnetic core loss and copper loss; 2. rectification diodes have conduction loss and reverse recovery loss; 3. synchronous rectification of the LLC circuit is greatly affected by MagAmp circuit; 4. its operation frequency is limited because of inherent dead-time effect of the MagAmp circuit. Hence the LLC+MagAmp circuit cannot achieve a higher efficiency.

FIG. 8 shows the LLC coupling with a transformer to accomplish multiple outputs. Its circuit structure includes an LLC circuit 302 connecting to a plurality of switches 301 and a transformer 303 that are the same as the conventional technique previously discussed. But it has a weighted voltage control circuit 92 and a coupling element 93 to regulate the duty period of a driver 305. Such a structure has cross regulation problem. First, the ratio of the coil number of the secondary winding is not totally equal to the output voltage ratio. Hence regulation accuracy is affected. Second, when the primary output is only controlled, the ancillary output is regulated merely by coupling that results in a lower accuracy. A weighted control can be adopted to provide improvement. But the weighted control has the error shared by two line outputs. This results in not accurate regulation of either line. Hence such a structure is applicable only in an environment where strict voltage stabilization is not required. In order to improve the cross regulation, multiple independent LLC circuits may be adopted to achieve a higher efficiency and more accurate regulation. But the cost and size are greater. Another alternative is using the LLC circuit as the primary output circuit and has a buck converter at the rear end connecting to the primary output circuit to form a secondary output circuit. Such an approach provides accurate regulation for each output circuit, but total efficiency is lower.

SUMMARY OF THE INVENTION

In view of the aforesaid advantages and drawbacks occurred to the conventional circuits set forth above, the present invention aims to provide a multi-output DC/DC converter that provides a higher power density and voltage stability at a lower cost. It employs LLC as the primary output and DAB as the ancillary output to combine the advantages of high efficiency and small size of LLC and DAB, and get resonant inductance of LLC and energy transmission inductance of DAB through leakage inductance of the transformer. Thus a high power density can be achieved, and output of each line can be regulated independently to accomplish a higher accuracy of voltage stability.

Therefore, the primary object of the present invention is to provide an improved circuit to meet the increasing demand of higher efficiency not achievable by the conventional circuitries and reduce loss and offer desired cross regulations.

The present invention provides a resonant converter equipped with a phase shifting output circuit. It includes a resonant circuit to receive an input power and regulate to become at least one resonant power, a switch unit to switch an ON period for the input power to pass through the resonant circuit and a power transformation circuit to regulate the resonant power and output a transformed power. The resonant circuit includes a resonant capacitor, a resonant inductor and a parallel inductor bridged between the resonant inductor and the power transformation circuit in a parallel manner. The resonant converter further has a primary output circuit and at least one secondary output circuit. The primary output circuit is connected to the power transformation circuit to regulate the transformed power to become a primary output power. The primary output circuit also is electrically connected to a resonant control unit which receives a feedback signal to generate a resonant control signal. The secondary output circuit is electrically connected to the power transformation circuit to receive the transformed power. The secondary output circuit has a bridge rectification unit and a phase shifting control unit. The phase shifting control unit is electrically connected to the resonant control unit to receive the resonant control signal and regulate to become a phase shifting driving signal. The bridge rectification unit is controlled by the phase shifting driving signal and regulates the transformed power to become a secondary output power. The resonant circuit has a resonant capacitor, a resonant inductor and a parallel inductor coupled in parallel with the power transformation circuit to form an LLC resonant circuit. The secondary output circuit is controlled by phase shifting. By means of the circuit structure set forth above, the efficiency can be enhanced, loss can be reduced, and the input power can be received in a wider voltage range without sacrificing normal operation efficiency. It also provides the multi-output benefit of the LLC circuit.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
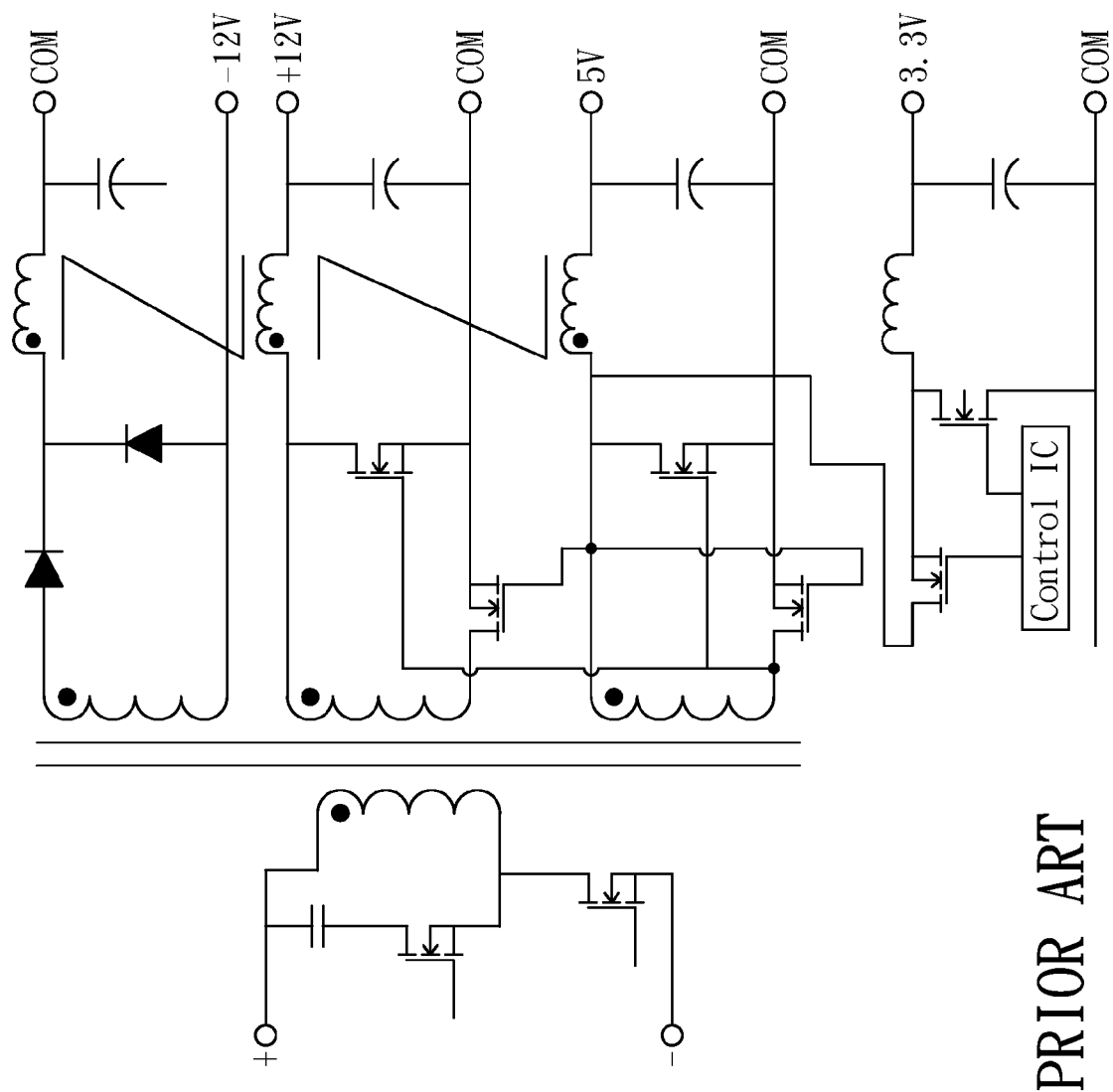
FIG. 1 is a circuit structure of a conventional active clamp forward circuit.
Figure 2:
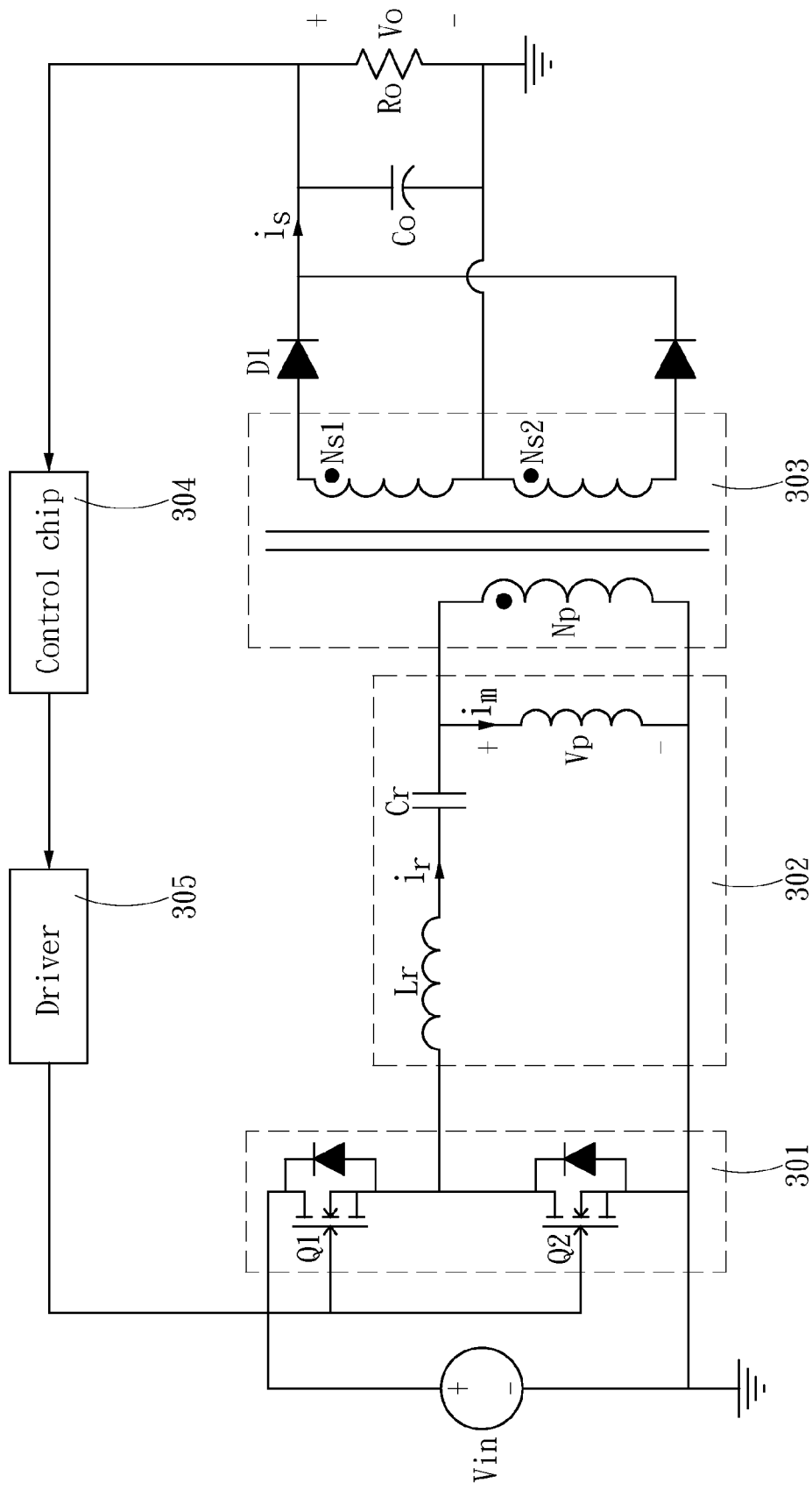
FIG. 2 is a circuit structure of a conventional LLC circuit.
Figure 3:
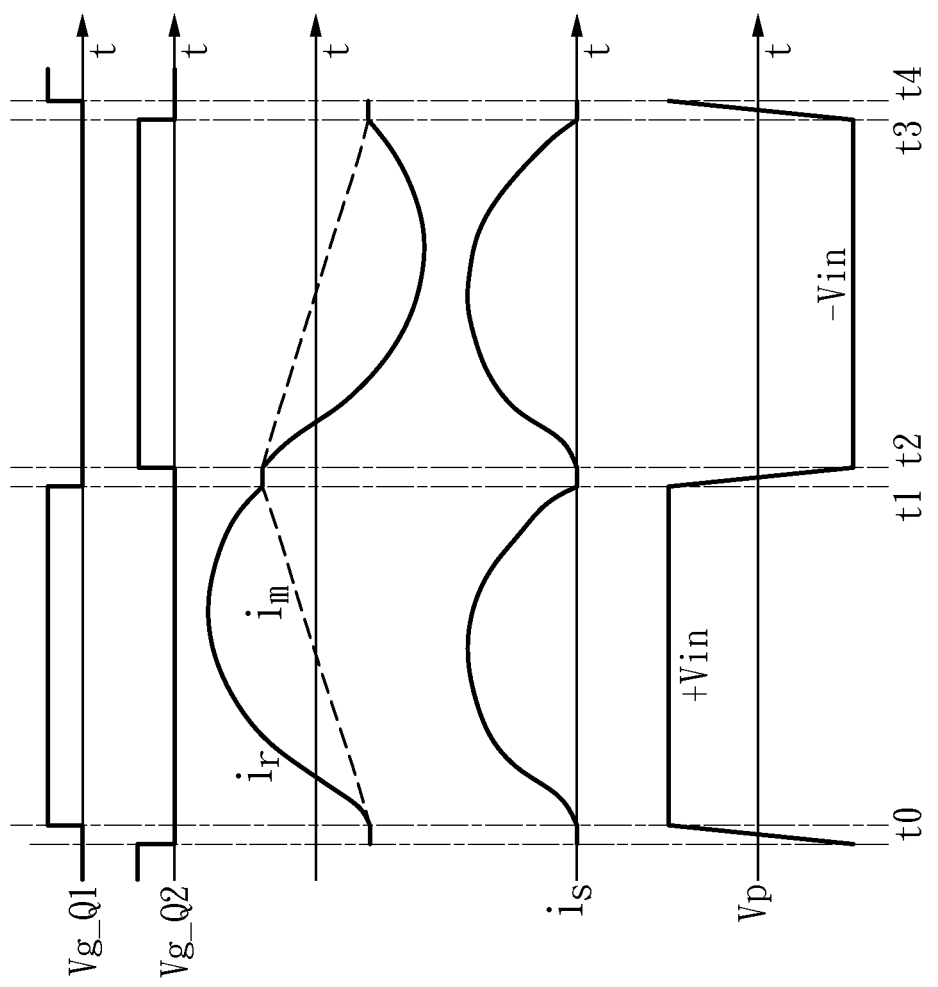
FIG. 3 is a waveform chart at nodes of the circuit in FIG. 2.
Figure 4:
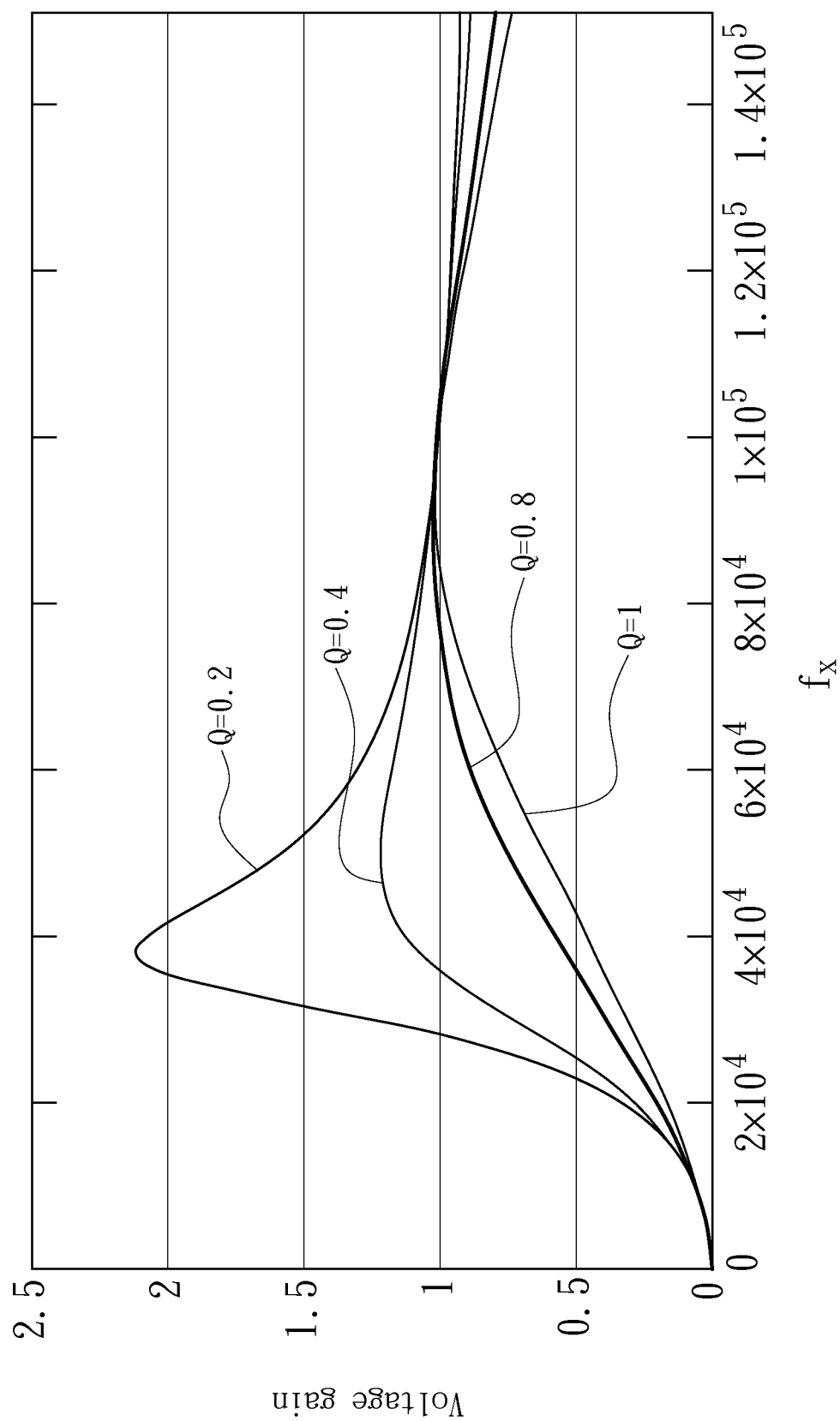
FIG. 4 is a chart showing resonant characteristic curves of the circuit in FIG. 2.
Figure 5:
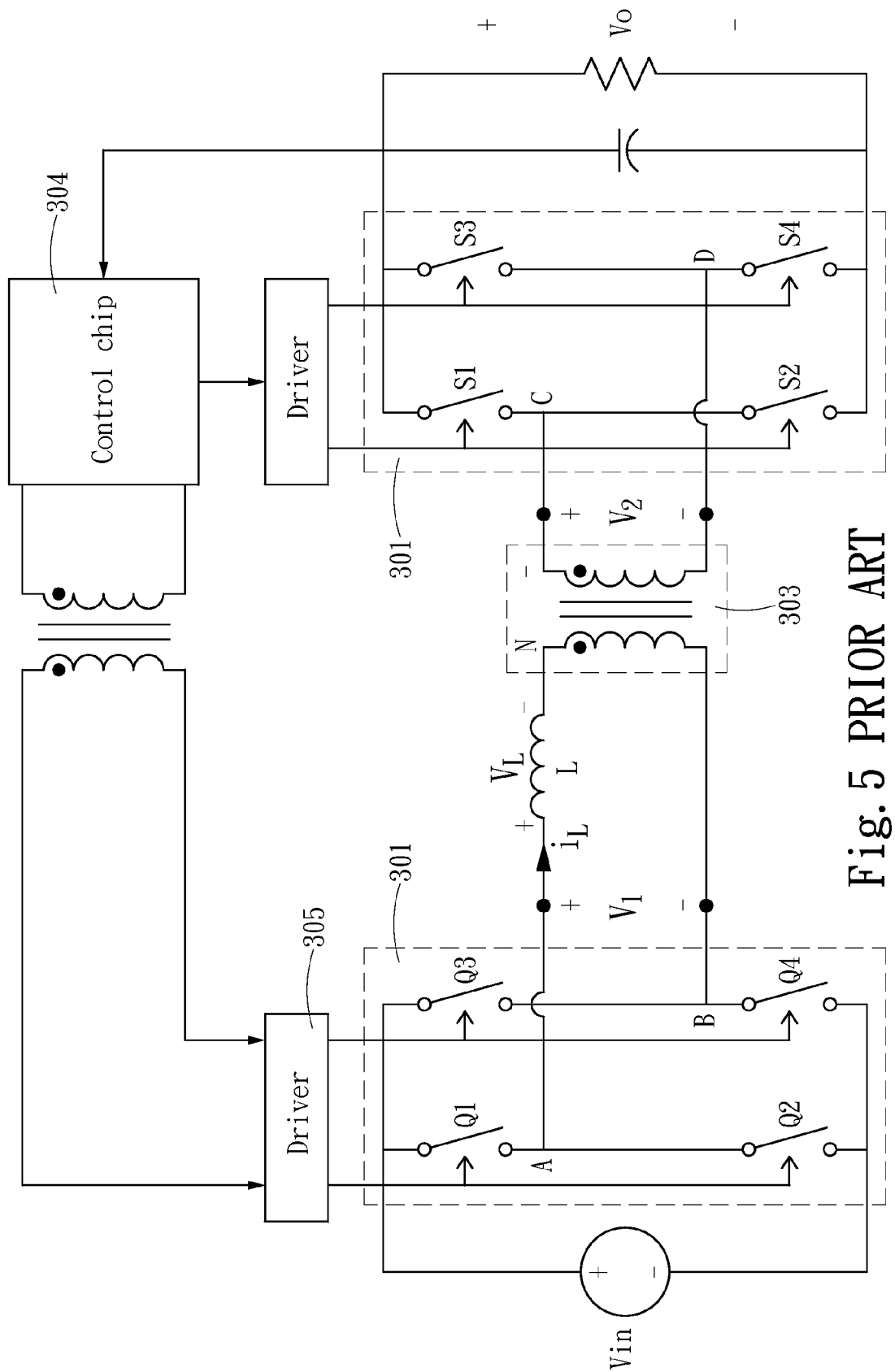
FIG. 5 is a circuit structure of a conventional dual active bridge circuit.
Figure 6:
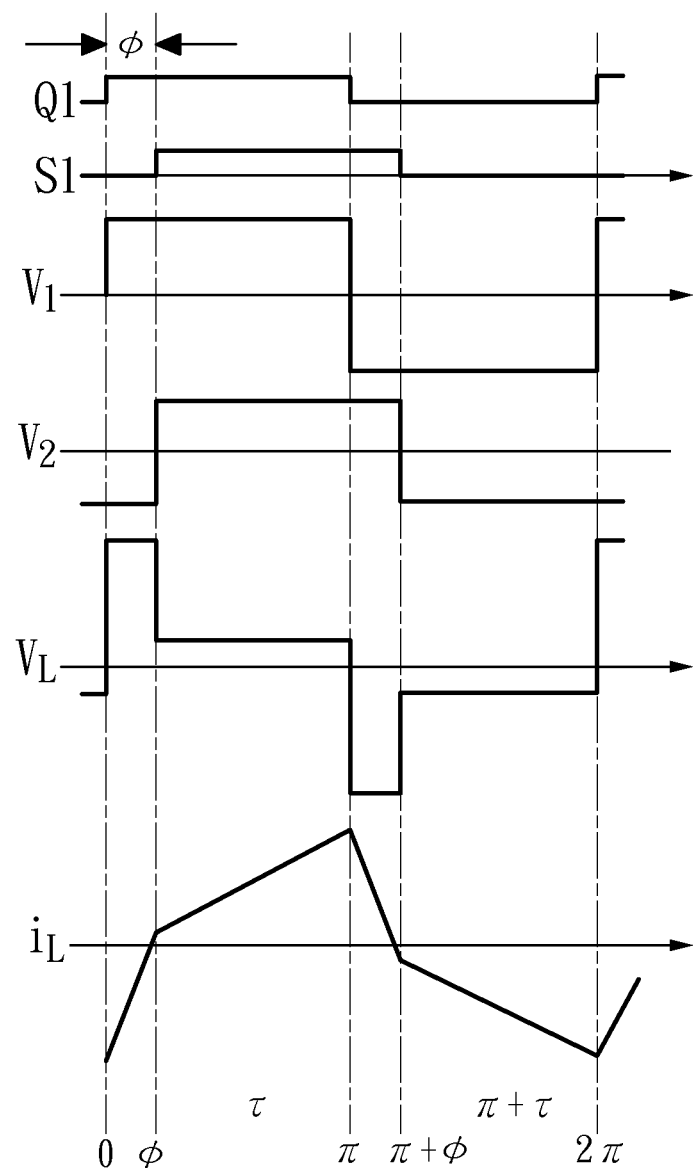
FIG. 6 is a waveform chart at nodes of the circuit in FIG. 5.
Figure 7:
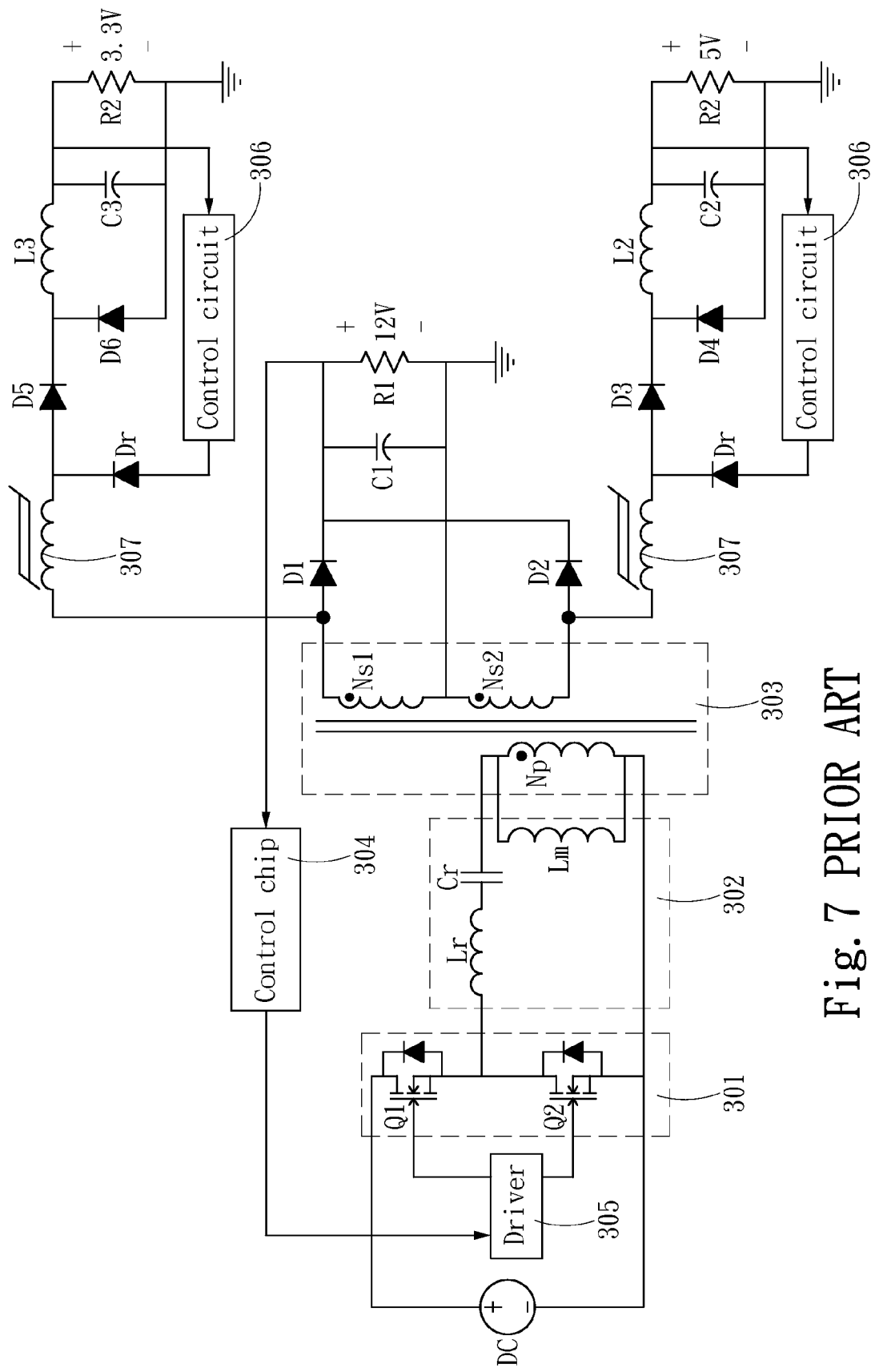
FIG. 7 a circuit diagram of a conventional embodiment for regulating secondary output power through MagAmp.
Figure 8:
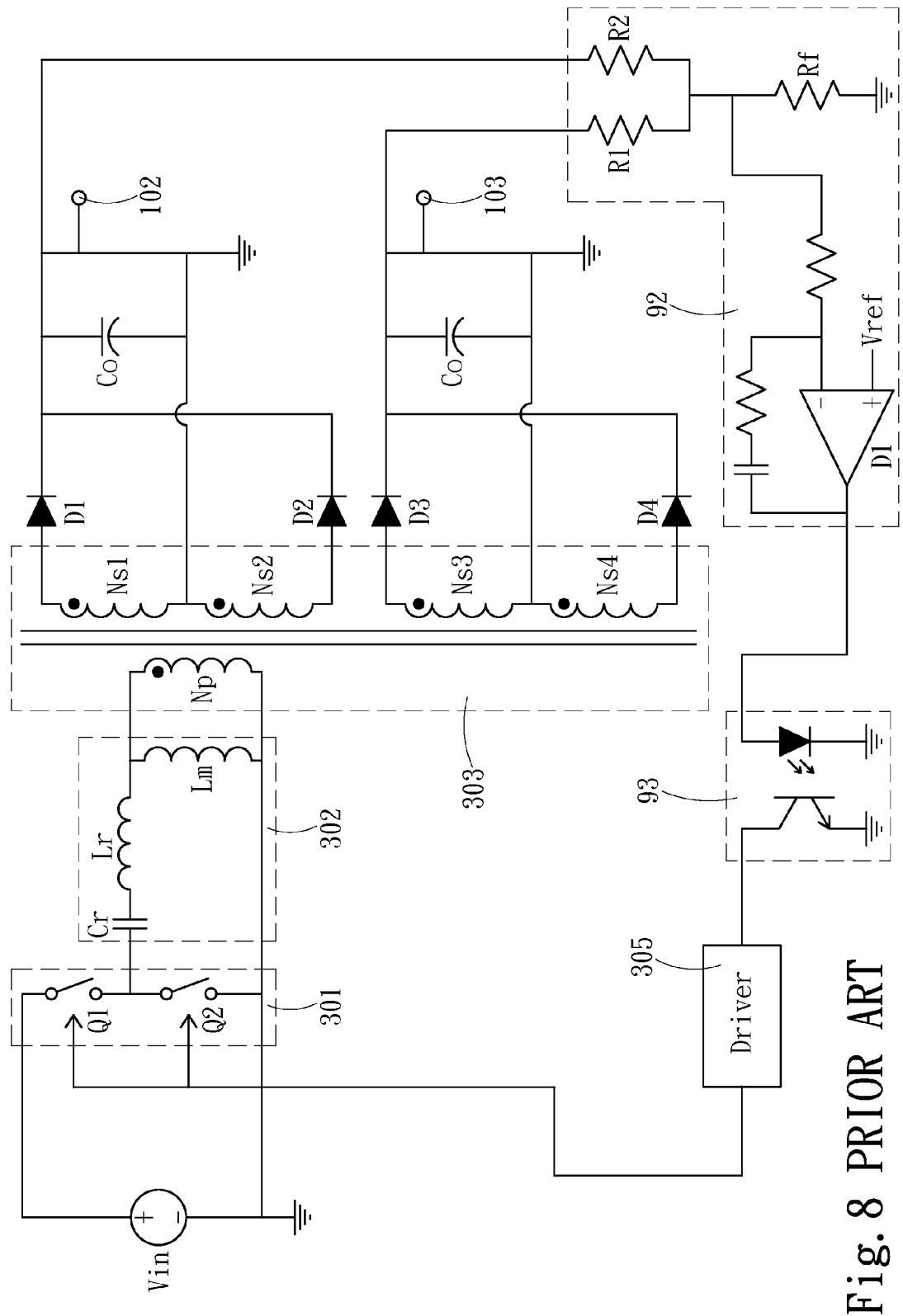
FIG. 8 is circuit diagram of another conventional embodiment for regulating secondary output power by adopting voltage ratio approach.
Figure 9:
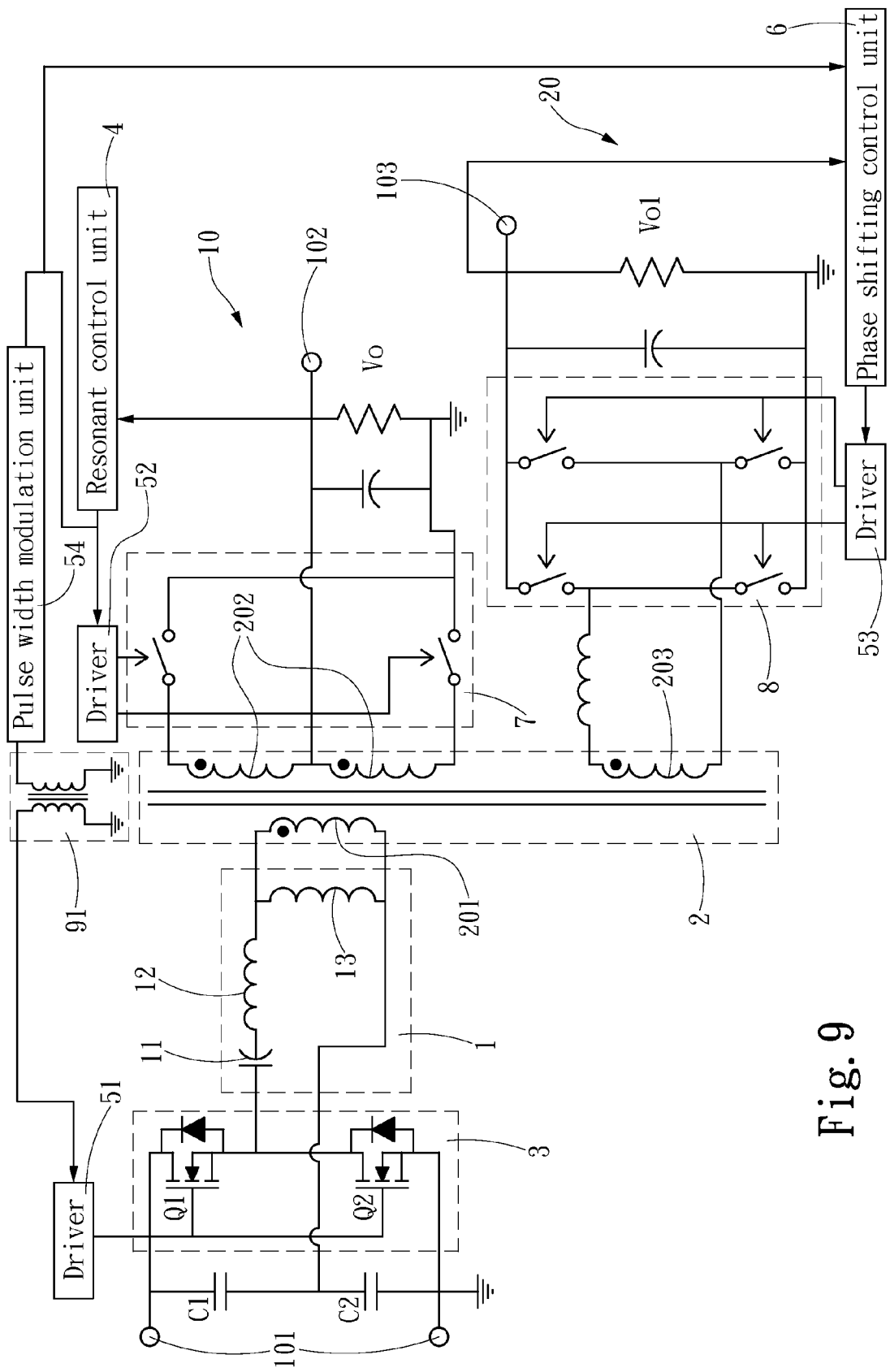
FIG. 9 is a circuit diagram of a first embodiment of the invention.

Please refer to FIG. 9 for a first embodiment of the invention. The resonant converter equipped with a phase shifting output circuit of the invention includes a switch unit 3, a resonant circuit 1 and a power transformation circuit 2. In this embodiment, the power transformation circuit 2 is a transformer which has a primary winding 201 and two independent secondary windings 202 and 203. The circuit is connected to a power source 101 to receive input power. The switch unit 3 switches an ON period for the input power to pass through the resonant circuit 1. The switch unit 3 is a bridge circuit consisting of multiple switch elements that are turned on alternately to control the period of the input power passing through the resonant circuit 1. The resonant circuit 1 includes a resonant capacitor 11, a resonant inductor 12 and a parallel inductor 13 bridging the resonant inductor 12 and the power transformation circuit 2 in a parallel manner. The resonant circuit 1 has resonant characteristics to regulate the input power to become resonant power sent to the power transformation circuit 2 which regulates the resonant power and outputs a transformed power. The switch unit 3 may be a half-bridge circuit consisting of two switch elements as shown in the drawing. The switch unit 3 may further be coupled with capacitors (C1 and C2 as shown in the drawing) in parallel at one side thereof to withstand a portion of DC voltage and to reduce the DC voltage applying to the resonant capacitor 11. As a result, the capacitor with a smaller withstand voltage may be selected (such as MLCC multilayer ceramic capacitor). The resonant converter further has a primary output circuit 10 and at least one secondary output circuit 20. The primary output circuit 10 has a synchronous rectification unit 7 connecting to the secondary winding 202 of the power transformation circuit 2 to receive the transformed power which is regulated to become a primary output power 102 through switching of the synchronous rectification unit 7. A resonant control unit 4 also is provided that is electrically connected to the primary output circuit 10 to capture a first feedback signal to generate a resonant control signal. The resonant control signal drives the synchronous rectification unit 7 through a driver 52, thereby to regulate the switching period of the synchronous rectification unit 7. The resonant control signal also is regulated through a pulse width modulation unit 54 to become a pulse form control signal. Through an ancillary winding 91, the control signal is sent to another driver 51 to provide power to drive the switch unit 3, so that each switch element thereof is driven by the resonant control signal generated by the resonant control unit 4, thereby control the passing period of the input power. On the other hand, the secondary output circuit 20 is connected to another independent secondary winding 203. The secondary output circuit 20 has a bridge rectification unit 8 electrically connected to the secondary winding 203 and a phase shifting control unit 6 electrically connected to the resonant control unit 4 to receive the resonant control signal. The bridge rectification unit 8 consists of a plurality of switch elements. The phase shifting control unit 6 receives the resonant control signal and regulates to generate a phase shifting driving signal which has a phase difference with the resonant control signal. The phase shifting driving signal drives the bridge rectification unit 8 through another driver 53. The bridge rectification unit 8 is driven by the phase shifting driving signal to regulate the transformed power to become a secondary output power 103. The phase shifting control unit 6 captures a second feedback signal from the secondary output power 103 to regulate the time interval of the phase shifting driving signal. Thus the secondary output circuit 20 can be controlled through a phase shifting approach to change output gain, perform zero voltage switching and reduce turn-off loss.

Figure 10:
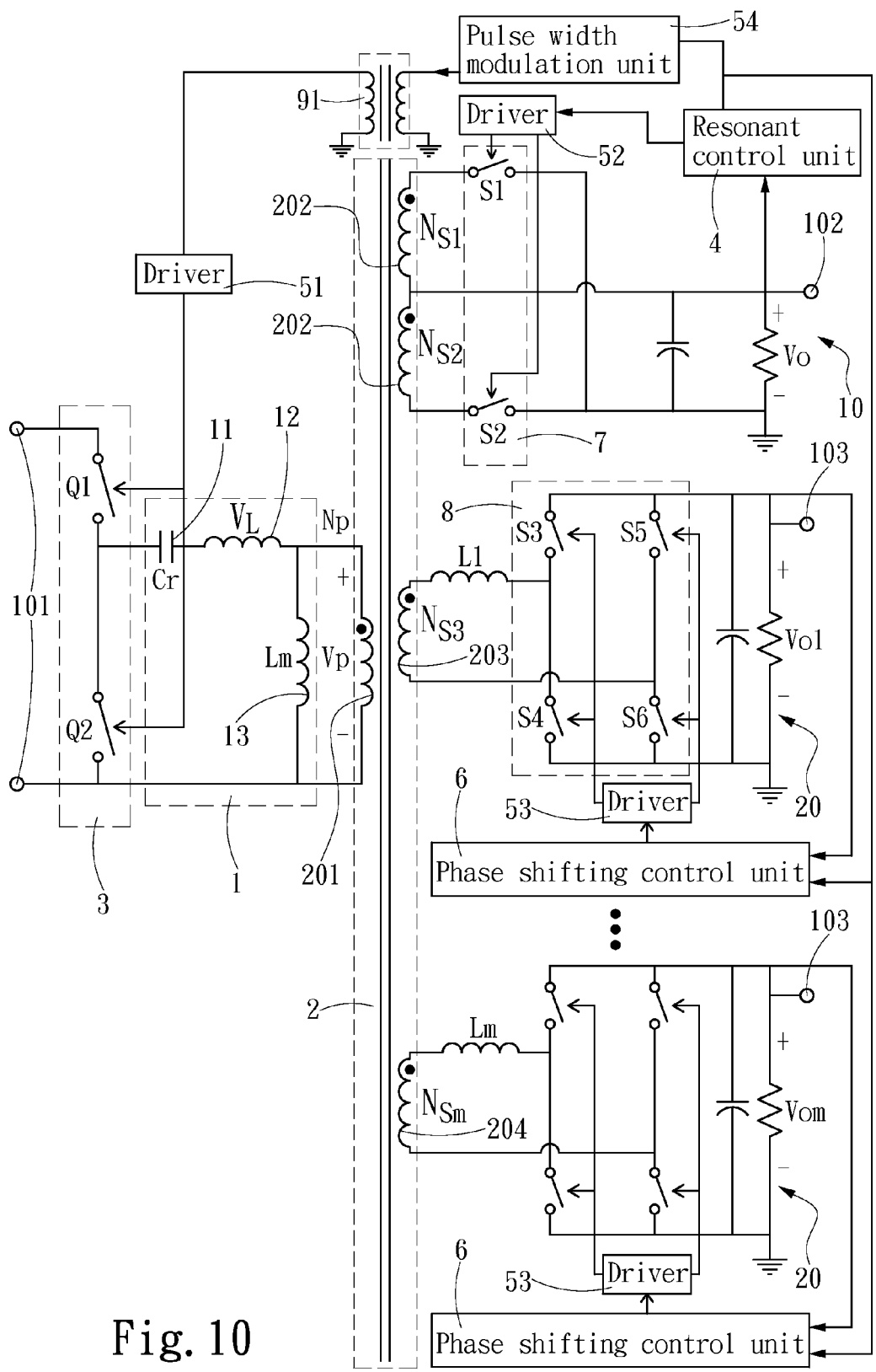
FIG. 10 is a circuit diagram of a second embodiment of the invention.

The embodiment depicted in FIG. 9 is the basic embodiment of the invention. The invention further has a plurality of secondary output circuits 20. Refer to FIG. 10 for a second embodiment of the invention. The power transformation circuit 2 also is a transformer wound with a plurality of coils, including a primary winding 201 and a plurality of independent secondary windings 202, 203, and 204. The secondary winding 202 is connected to the primary output circuit 10. Other secondary windings 203 and 204 are connected respectively to the secondary output circuits 20. The power transformation circuit 2 has a front end (the primary side of the transformer) connecting to the switch unit 3 to control the period of the input power passing through the resonant circuit 1. FIG. 10 shows that the switch unit 3 is a basic half-bridge circuit. Operation of the switch unit 3 also is controlled by the resonant control signal of the resonant control unit 4 (sending to the switch unit 3 through the pulse width modulation unit 54, ancillary winding 91 and driver 51). The power transformation circuit 2 has a rear end (secondary side of the transformer) connecting to the primary output circuit 10 which adopts the same structure shown in FIG. 9. The embodiment shown in FIG. 10 has the transformer wound by multiple secondary windings 203 and 204 connecting to multiple secondary output circuits 20 to generate multiple secondary output power 103. At least one of the secondary output power 103 has a potential different from the primary output power 102, and multiple secondary output power 103 even can have different potential. Moreover, each secondary output power 103 is delivered independently through the independent phase shifting control unit 6 and driver 53 at the same or different potential. Hence such a power structure allows output number and voltage to be set according to power supply requirements. In the embodiments shown in FIGS. 9 and 10, the switch unit 3, synchronous rectification unit 7 and bridge rectification unit 8 of the secondary output circuit 20 may be full bridge or half-bridge circuits consisting of multiple switch elements. The synchronous rectification unit 7 may also be a circuit with center-tapped (referring to FIG. 9). The technique of getting power for multiple switch elements by center tapping is known in the art. FIG. 9 serves merely as an example.

Figure 11:
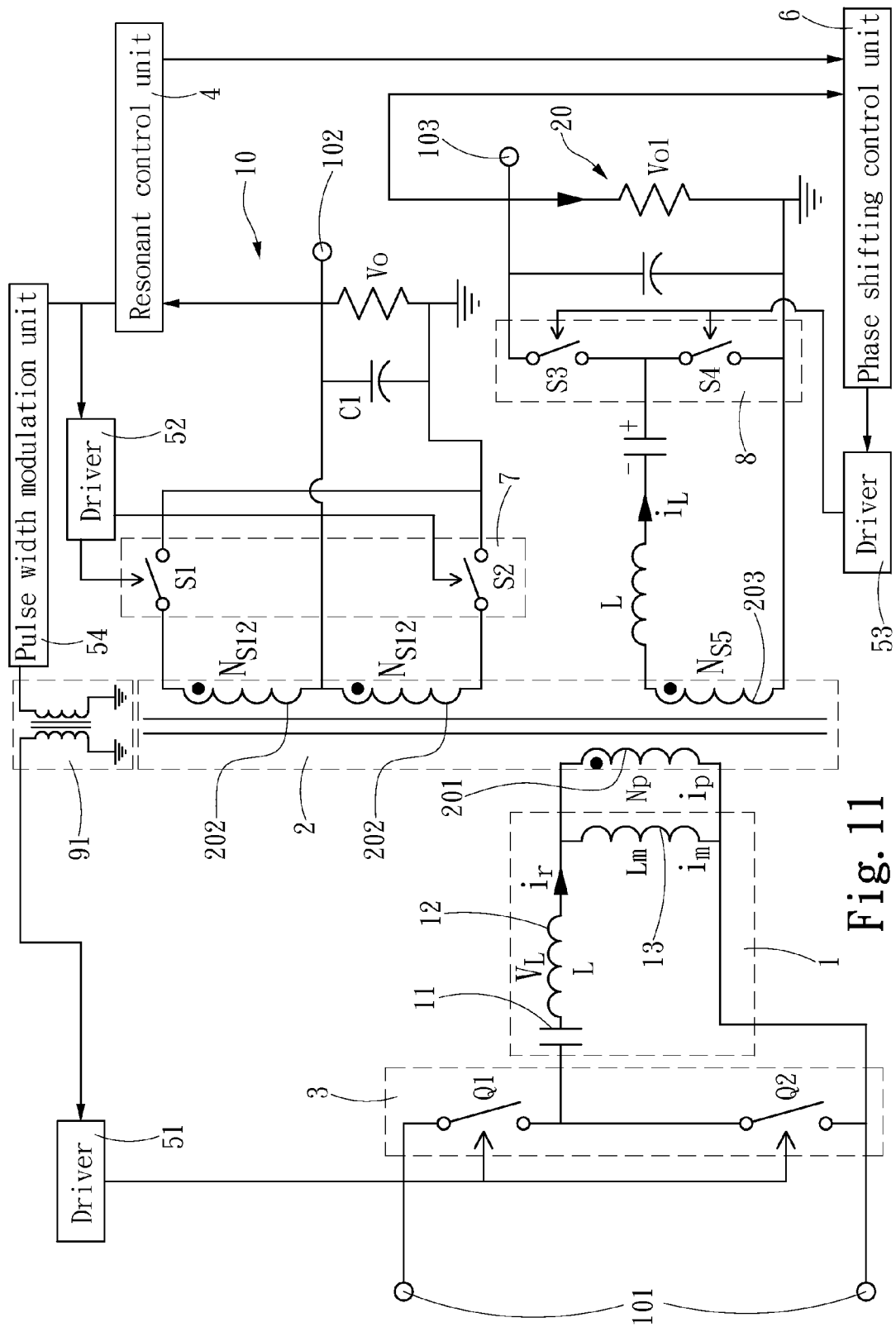
FIG. 11 is a circuit diagram of a third embodiment of the invention.
Figure 12:
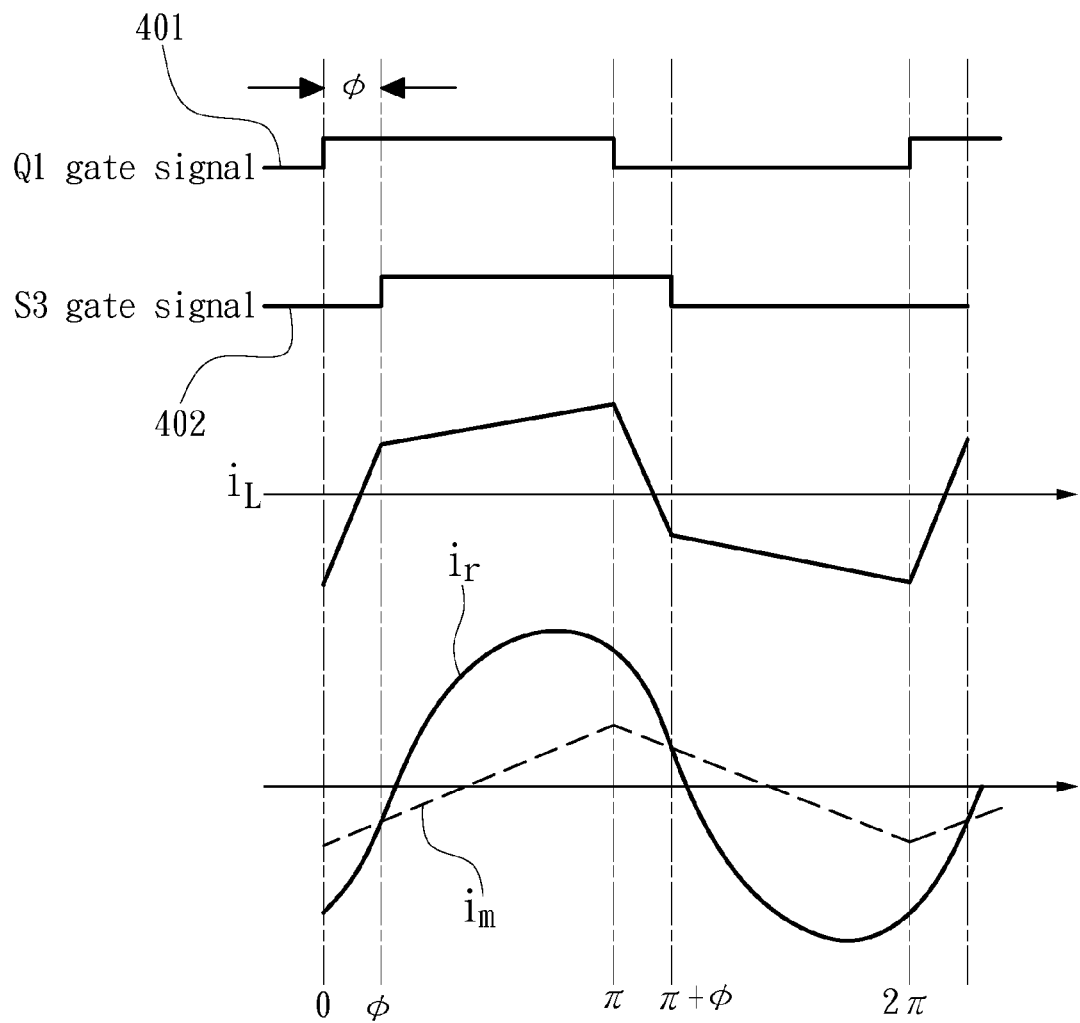
FIG. 12 is a power waveform chart according to FIG. 11.
Figure 13:
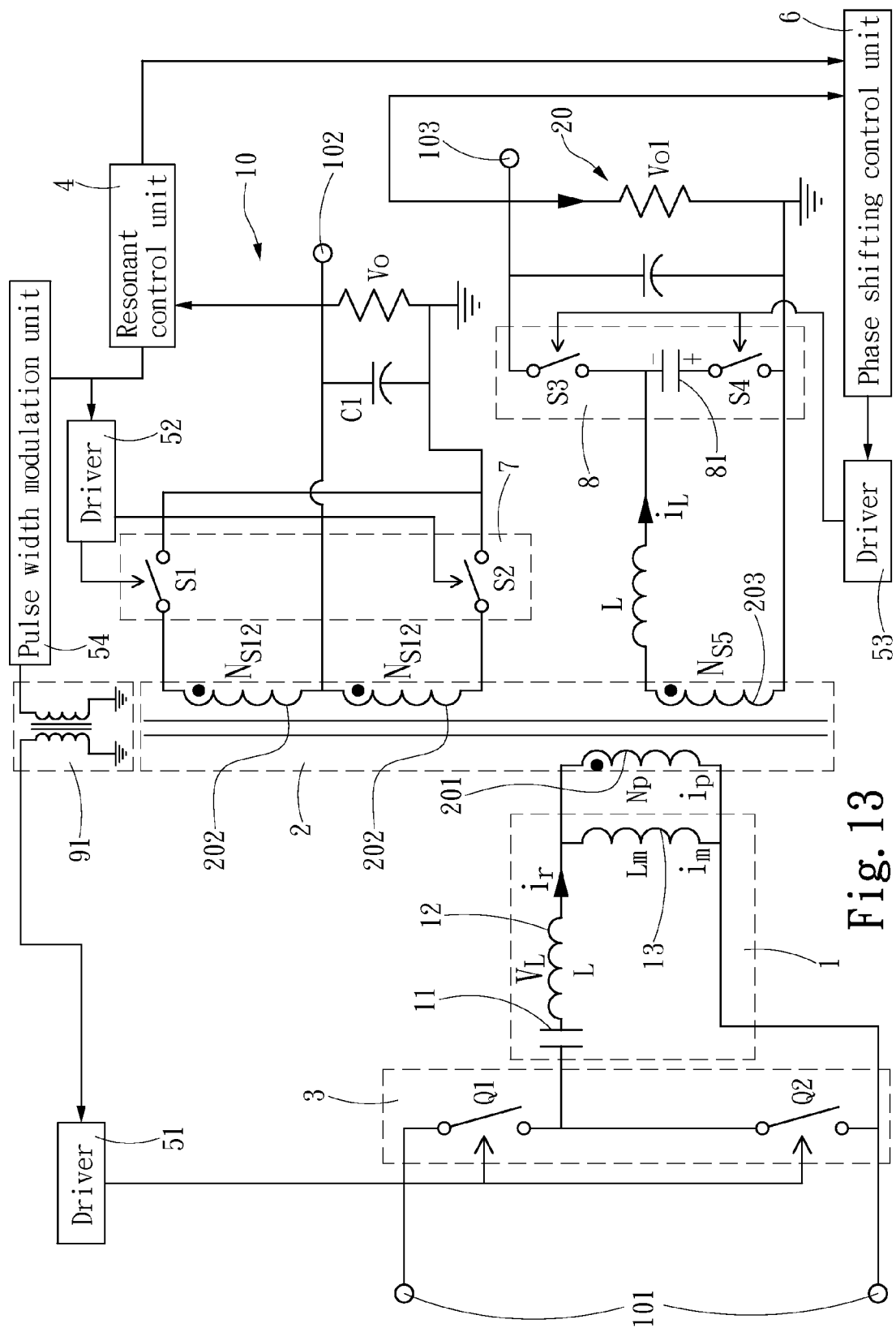
FIG. 13 is a circuit diagram of a fourth embodiment of the invention.
Figure 14:
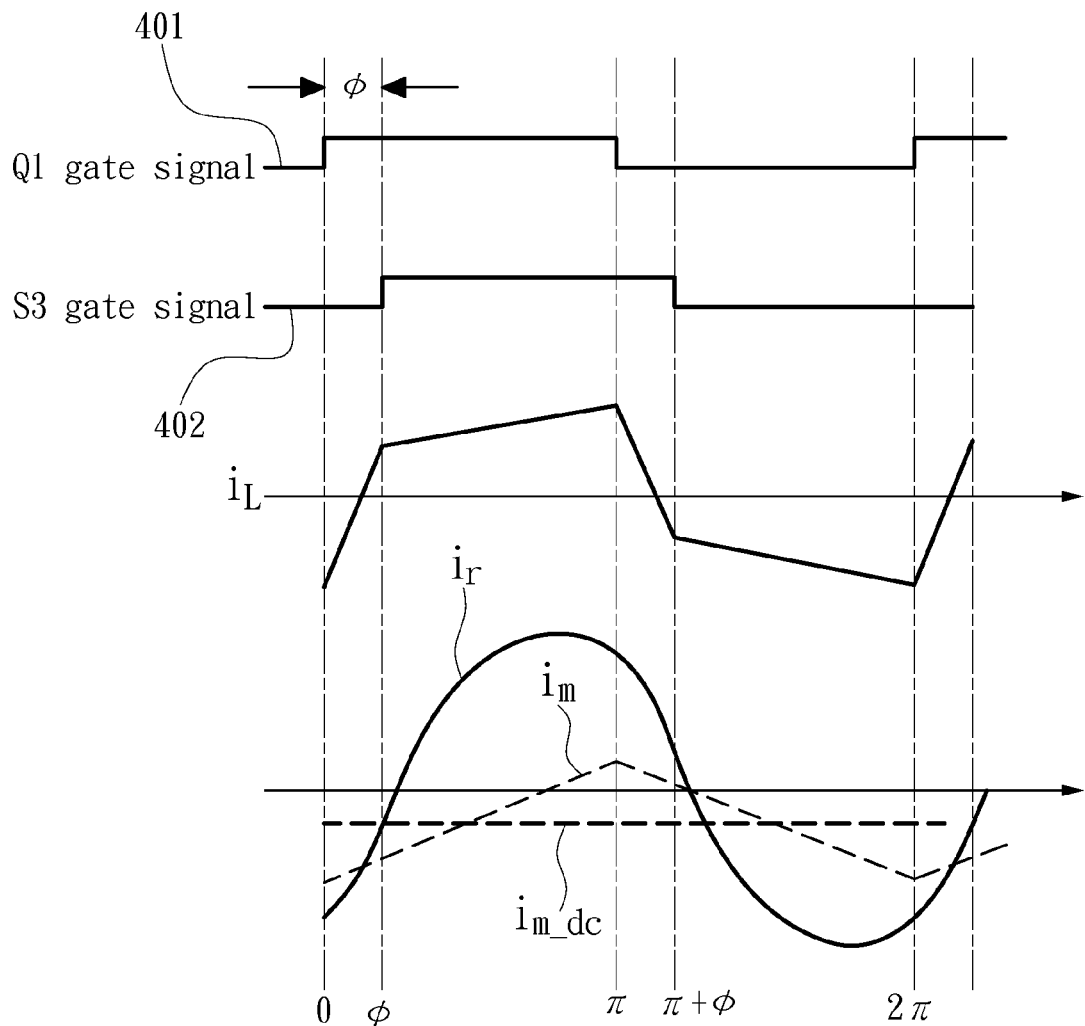
FIG. 14 is a waveform chart at nodes of the circuit in FIG. 13.

Refer to FIG. 11 for a third embodiment of the invention. In this embodiment, the switch unit 3 and the bridge rectification unit 8 are half-bridge type. Refer to FIG. 12 for the power waveforms in which a resonant control signal 401 and a phase shifting control signal 402 form a phase shifting angle Φ between them. By controlling the phase shifting angle Φ, output gain can be adjusted. Refer to FIG. 13 for the circuit diagram of a fourth embodiment that is substantially the same as the one shown in FIG. 11. But the bridge rectification unit 8 of the secondary output circuit 20 further has a clamp capacitor 81 which regulates the potential output from the bridge rectification unit 8 higher or lower to adjust the output potential of the secondary output power 103 (also referring to FIG. 14). The operation principle of the clamp capacitor 81 is known in the art, thus details are omitted herein.

Figure 15:
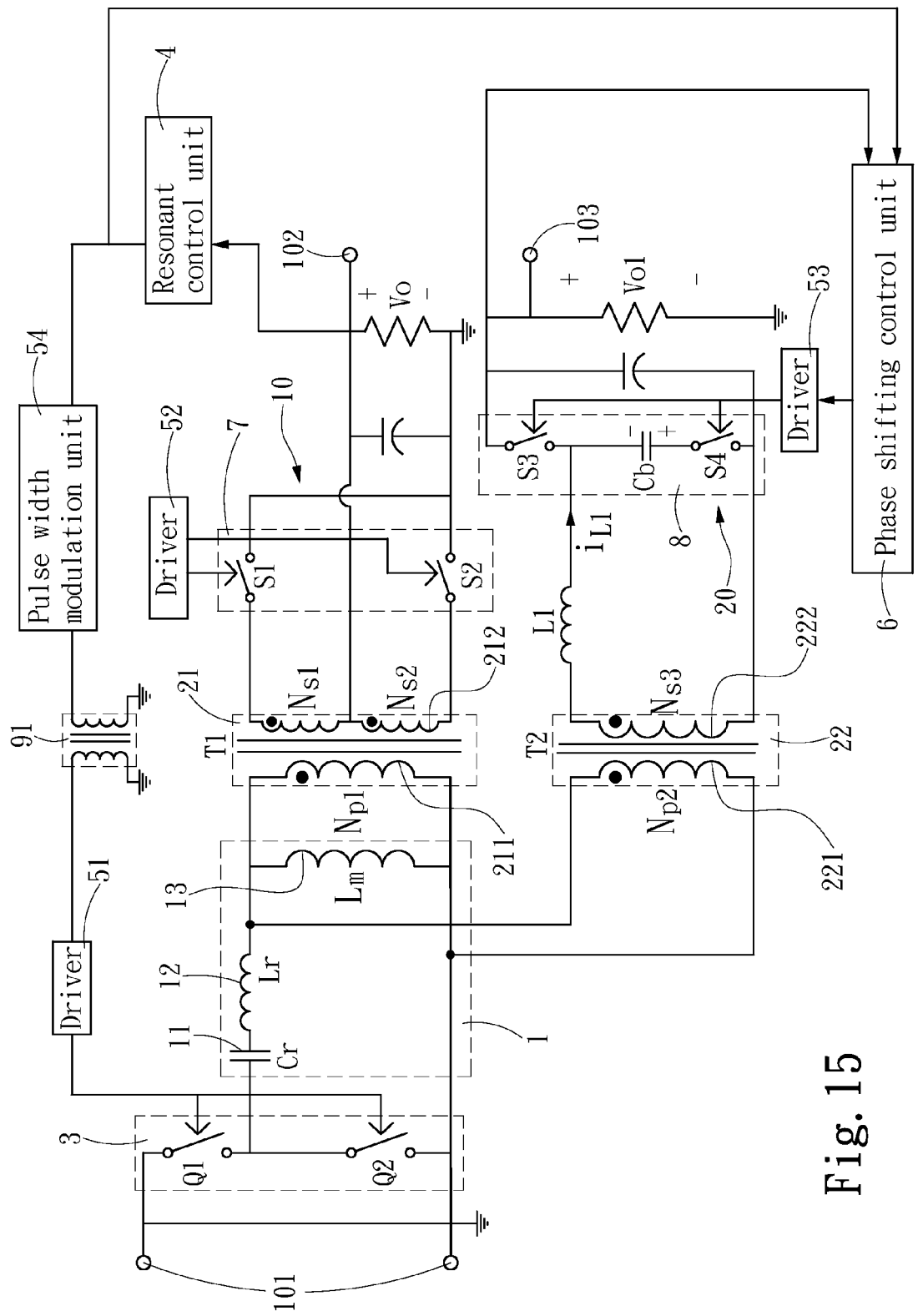
FIG. 15 is a circuit diagram of a fifth embodiment of the invention.
Figure 16:
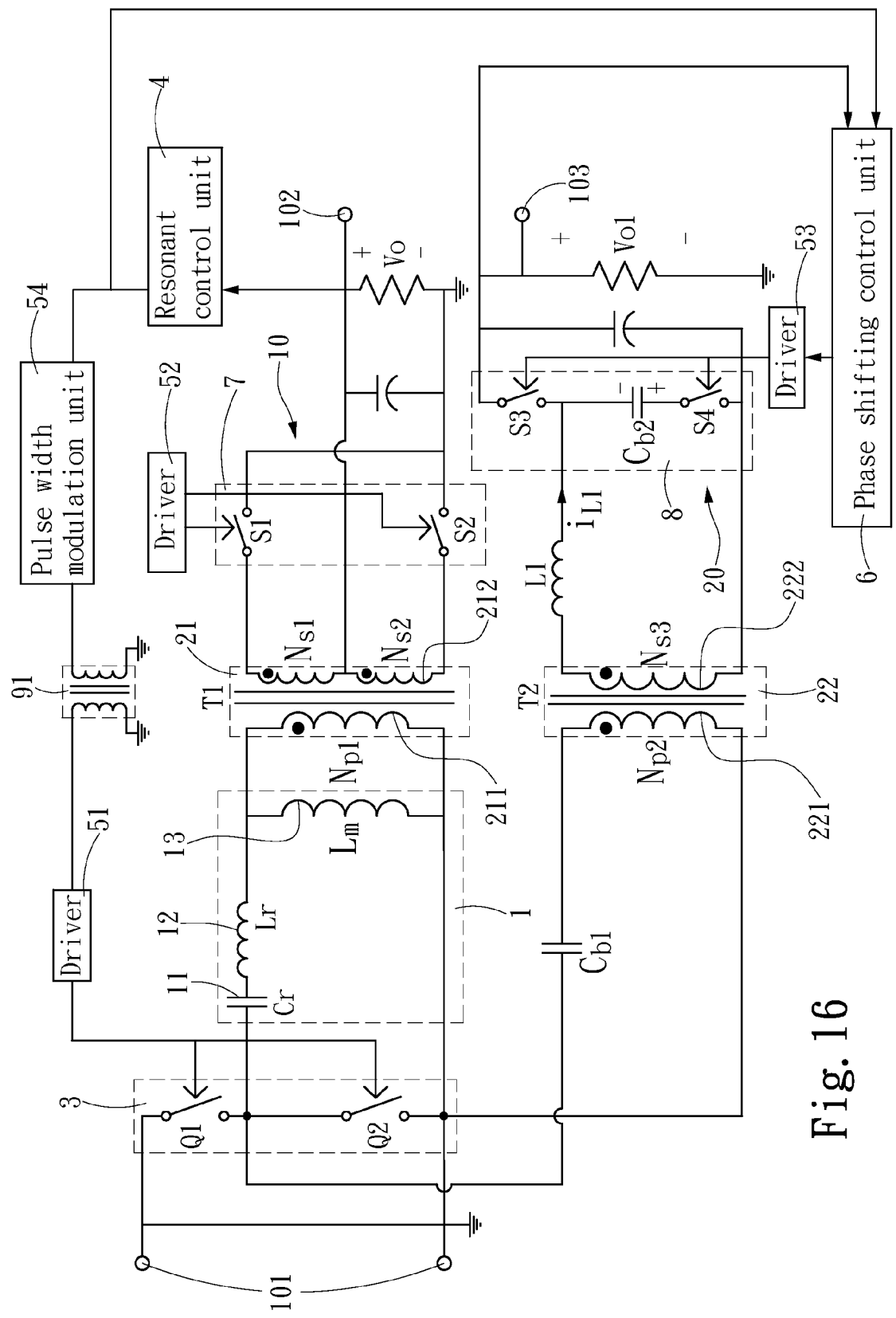
FIG. 16 is a circuit diagram of a sixth embodiment of the invention.

Refer to FIG. 15 for a fourth embodiment of the invention. In this embodiment, the power transformation circuit 2 includes one or more transformers in which one is defined as a primary transformer 21 and the rest defined as one or more secondary transformer 22. The primary and secondary transformers 21 and 22 have respectively a primary winding 211 and 221, and a secondary winding 212 and 222. The primary winding 211 of the primary transformer 21 is connected to the resonant circuit 1. The parallel inductor 13 is coupled in parallel with the primary winding 211. The secondary winding 212 of the primary transformer 21 is connected to the primary output circuit 10. The resonant circuit 1 is connected to the resonant inductor 12 in parallel with the parallel inductor 13. The secondary winding 222 of the secondary transformer 22 is connected to at least one secondary output circuit 20. The secondary output circuit 20 has a bridge rectification unit 8 controlled by the phase shifting control unit 6 and the driver 53. The phase shifting control unit 6, aside from connecting to the resonant control unit 4, also captures a second feedback signal from the secondary output power 103 to regulate the time interval of the phase shifting driving signal. FIG. 16 shows a sixth embodiment which has multiple sets of transformers that include at least one primary transformer 21 and at least one secondary transformer 22 (each has one in FIG. 16). The main circuit structure is the same as that of FIG. 15. However, the secondary transformer 22 in FIG. 16 has the primary winding 221 connecting to the switch unit 3 and the resonant circuit 1 in a parallel manner. The primary winding 221 of the secondary transformer 22 and the switch unit 3 are bridged by a capacitor (Cb). The secondary winding 222 of the secondary transformer 22 is connected to the output of the secondary output circuit 20 and controlled by the phase shifting control unit 6. The phase shifting control unit 6, aside from connecting to the resonant control unit 4, also captures a second feedback signal from the secondary output power 103 to regulate the time interval of the phase shifting driving signal.

As previously discussed, the circuits set forth above can achieve the high efficiency of the LLC circuit, also can regulate the power of multiple output circuits through phase shifting control. The invention has the advantages of LLC circuit and DAB circuit. Each secondary output circuit can be independently and accurately regulated through the phase shafting control unit 6. It has a higher efficiency and greater input voltage range of the LLC circuit and desirable post regulation capability of the DAB circuit. Thus total efficiency is higher and regulation can be done accurately.

While the preferred embodiments of the invention have been set forth for the purpose of disclosure, they are not the limitation of invention. For instance, the switch unit 3 may be a full bridge circuit, a half-bridge circuit or a half-bridge circuit coupling with capacitors (all the three types are rectification circuits as known in the art). The bridge rectification unit 8 may also be a full bridge circuit, a half-bridge circuit or a half-bridge circuit coupling with a clamp capacitor 81. While the parallel inductor 13 is independent in the drawings, the resonant circuit 1 may also function as the parallel inductor 13 through the equivalent magnetizing inductance of the primary transformer 21, thus the physical inductor may be omitted in the resonant circuit 1. By connecting to the primary transformer 21, the generated equivalent magnetizing inductance thereof can produce resonance to achieve desired effect. Therefore, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A resonant converter equipped with a phase shifting output circuit, comprising a resonant circuit to receive input power and regulate to become at least one resonant power, a switch unit to switch an ON period for the input power to pass through the resonant circuit, and a power transformation circuit to regulate the resonant power and output a transformed power; the resonant circuit including a resonant capacitor, a resonant inductor and a parallel inductor parallel bridging the resonant inductor and the power transformation circuit, wherein the resonant converter further includes:

a resonant control unit to generate a resonant control signal;

a pulse width modulation unit to regulate the resonant control signal to become a pulse form control signal;

an ancillary winding through which the pulse form control signal is sent to the switch unit;

a driver to provide power to drive the switch unit and to enable control of the switch unit by the resonant control signal generated by the resonant control unit to control the passing period of the input power;

a primary output circuit which is connected to the power transformation circuit to regulate the transformed power with a synchronous rectification unit to become a primary output power, the resonant control unit being electrically connected to the primary output circuit to capture a feedback signal and generate the resonant control signal, the synchronous rectification unit being controlled based on the resonant control signal; and at least one secondary output circuit which is connected to the power transformation circuit to receive the transformed power and has a bridge rectification unit and a phase shifting control unit; the phase shifting control unit being electrically connected to the resonant control unit to receive the resonant control signal and regulate to become a phase shifting driving signal, the bridge rectification unit being controlled by the phase shifting driving signal to regulate the transformed power to become a secondary output power.

2. The resonant converter of claim 1, wherein the resonant converter includes a plurality of the secondary output circuits, and the power transformation circuit is a transformer which has a primary winding, a first secondary winding connecting to the primary output circuit, and a plurality of independent second secondary windings connecting respectively to the secondary output circuits.

3. The resonant converter of claim 2, wherein the second secondary windings have different numbers of winding coils such that at least one of the secondary output power provided by the secondary output circuits has a potential different from the primary output power.

4. The resonant converter of claim 1, wherein the power transformation circuit includes a plurality of transformers, one of the plurality of transformers having a first secondary winding is defined as a primary transformer and one of the plurality of transformers having a second secondary winding is defined as a secondary transformer, the first secondary winding of the primary transformer is connected to the primary output circuit to output the primary output power and the second secondary winding of the secondary transformer is connected to the secondary output circuit to output the secondary output power.

5. The resonant converter of claim 4, wherein the secondary transformer has a primary side connecting to the resonant circuit.

6. The resonant converter of claim 4, wherein the secondary transformer has a primary side coupled in parallel with the primary side of the primary transformer.

7. The resonant converter of claim 4, wherein the secondary transformer has a. primary side connecting to the switch unit and in parallel with the resonant circuit, the primary side of the secondary transformer and the switch unit being bridged by a capacitor.

8. The resonant converter of claim 1, wherein the phase shifting driving signal is regulated by the phase shifting control unit to form a phase difference with the resonant control signal.

9. The resonant converter of claim 1, wherein the phase shifting control unit captures a second feedback signal from the secondary output power to regulate a time interval of the phase shifting driving signal.

10. The resonant converter of claim 1, wherein the switch unit is a full bridge circuit consisting of a plurality of switch elements, each switch element being driven by the resonant control signal generated by the resonant control unit.

11. The resonant converter of claim 1, wherein the switch unit is a half-bridge circuit consisting of a plurality of switch elements, each switch element being driven by the resonant control signal generated by the resonant control unit.

12. The resonant converter of claim 11, wherein the switch elements of the switch unit are coupled in parallel with corresponding capacitors.

13. The resonant converter of claim 1, wherein the primary output circuit has a synchronous rectification unit controlled by the resonant control signal and connected to the power transformation circuit.

14. The resonant converter of claim 13, wherein the synchronous rectification unit is a full bridge rectification circuit consisting of a plurality of switch elements.

15. The resonant converter of claim 13, wherein the synchronous rectification unit is a center-tapped circuit consisting of a plurality of switch elements.

16. The resonant converter of claim 1, wherein the bridge rectification unit is a full bridge rectification circuit consisting of a plurality of switch elements.

17. The resonant converter of claim 1, wherein the bridge rectification unit is a half-bridge rectification circuit consisting of a plurality of switch elements.

18. The resonant converter of claim 17, wherein the switch elements of the bridge rectification unit are connected in series to a clamp capacitor to regulate the potential output from the bridge rectification unit.

19. The resonant converter of claim 1, wherein the switch unit comprises a bridge circuit comprising a plurality of switch elements that are turned on alternately to control a period of the input power passing through the resonant circuit.

20. A resonant converter equipped with a phase shifting output circuit, comprising a resonant circuit to receive input power and regulate to become at least one resonant power, a switch unit to switch an ON period for the input power to pass through the resonant circuit, and a power transformation circuit to regulate the resonant power and output a transformed power; the resonant circuit including a resonant capacitor, a resonant inductor and a parallel inductor parallel bridging the resonant inductor and the power transformation circuit, wherein the resonant converter further includes:

a resonant control unit to generate a resonant control signal;

a pulse width modulation unit to regulate the resonant control signal to become a pulse form control signal;

a driver to provide power to drive the switch unit and to enable control of the switch unit by the resonant control signal generated by the resonant control unit to control the passing period of the input power;

a primary output circuit which is connected to the power transformation circuit to regulate the transformed power with a synchronous rectification unit to become a primary output power, the resonant control unit being electrically connected to the primary output circuit to capture a feedback signal and generate the resonant control signal, the synchronous rectification unit being controlled based on the resonant control signal; and at least one secondary output circuit which is connected to the power transformation circuit to receive the transformed power and has a bridge rectification unit and a phase shifting control unit; the phase shifting control unit being electrically connected to the resonant control unit to receive the resonant control signal and regulate based on the resonant control signal to become a phase shifting driving signal, the bridge rectification unit being controlled by the phase shifting driving signal to regulate the transformed power to become a secondary output power.

* * * * *